UNITED STATES PATENT OFFICE.

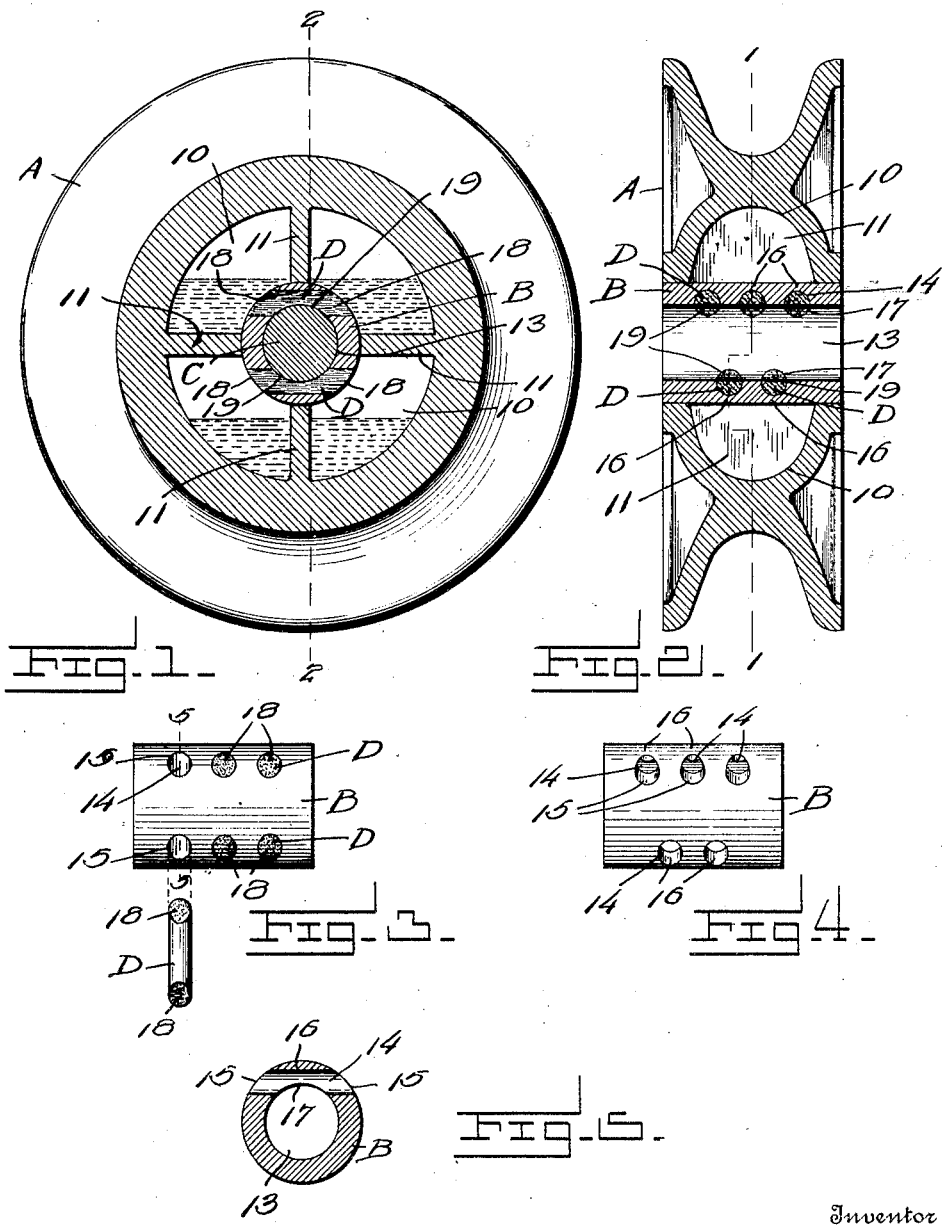

JOHN CESSNA SHARP, OF CHATTANOOGA, TENNESSEE.

TROLLEY-WHEEL.

1,113,913.  Specification of Letters Patent. Patented Oct. 13, 1914.

Application filed September 13, 1912. Serial No. 720,171.

*To all whom it may concern:*

Be it known that I, JOHN CESSNA SHARP, a citizen of the United States, residing at Chattanooga, in the county of Hamilton and State of Tennessee, have invented new and useful Improvements in Trolley-Wheels, of which the following is a specification.

This invention relates to wheels, pulleys, and the like of the type sometimes referred to as being self-lubricating, wherein there is a chamber for lubricating material and a bushing having inserts or feeders intended to carry the lubricating material to the surface which is to be lubricated, in such manner as to cause said surface to receive the proper amount of lubricant without waste of the latter.

A leading purpose of the present invention is to provide a wheel, pulley, or the like, of the type stated, whose manufacture and use will introduce such economies as will render it efficient to the highest degree Other purposes will be apparent from the following description of the preferred embodiment of the invention.

In accordance with the leading purpose of the invention the bushing is so constructed that it may be most economically manufactured and when its parts are assembled and mounted in the wheel and in operative relation with the shaft or pin will assure proper lubrication of said shaft or pin without any waste or loss of the lubricant and without any danger of displacement of the lubricant-feeders; and the wheel is so constructed and correlated with said bushing that it will have internal lubricant-chambers which receive the bushing and whose openings are sealed by the bushing, said chambers being separated from each other by walls or partitions whose inner edges engage the bushing and which walls or partitions serve as baffle-plates and secure at all times, no matter at what position the wheel stops, a supply of oil to some portion of the bushing.

The invention consists in certain peculiarities in the construction and arrangement of parts and in certain novel combinations of elements substantially as hereinafter described and particularly set forth in the subjoined claims.

In the accompanying drawings illustrating the preferred construction of the bushing and a very desirable application thereof: Figure 1 is a vertical section of a trolley wheel and its pin embodying the present invention, the section of the wheel being taken on the line 1—1 of Fig. 2. Fig. 2 is a section of the wheel on the line 2—2 of Fig. 1, this view omitting the shaft or pin. Fig. 3 is a detail representation of the bushing with one of the lubricant feeders separated from the bushing; the bushing being viewed from the side which discloses one of the series of transverse bores. Fig. 4 is a detail representation of the bushing viewed from a position at an angle to that of Fig. 3, and shows corresponding ends of two series of transverse bores. Fig. 5 is a cross section through the bushing on a plane extending longitudinally through one of the transverse bores, the line 5—5 of Fig. 3 for example, the feeder or plug being omitted.

I have selected a trolley wheel to exemplify the present invention, but it will be understood that the invention may be embodied in many different types of wheels, and in pulleys and other parts of machinery, apparatus, or devices. For this reason, the present invention is intended to be of broad application and the illustrated embodiment thereof in a trolley wheel is intended to be merely exemplary of one of a number of different suitable applications thereof.

The body A of the wheel is provided with a plurality of closed and separated lubricant chambers 10, being constructed with oppositely arranged inwardly-extending walls or partitions 11 whose inner edges engage the outer surface of a bushing B which is fixedly mounted in the body of the wheel. The bushing extends across the chambers 10 and has its ends tightly fitted to the walls surrounding the axial openings of the body of the wheel, while the circumferential portion of its intermediate part is exposed to the chambers 10 so as to be submerged in the lubricant, usually oil, in said chambers. The walls or partitions 11 coöperate with the bushing, to the circumferential surface of which their inner ends are tightly fitted, in dividing the body of the wheel into a plurality of lubricant chambers having no communication with each other and relatively so arranged that lubricant will be in contact with the bushing in all positions of the wheel, even when the area of the body of lubricant is less than the combined area of the chambers, the advantages of which will be apparent. Moreover, the correlation of the partitions and bushing is such as to produce a wheel of maximum strength, insure an accurate fit of the bushing and overcome all danger of leakage of the lubricant at the ends of the bushing.

The bushing B is provided with a longitudinal opening or bore 13 through which extends the shaft or pin C upon which the wheel is rotatably mounted; and is further provided with a suitable number of transverse openings or bores 14 which have their opposite ends 15 open to the lubricant chambers 10 and are so arranged in the bushing that their outer surfaces will be closed by sections 16 of the outer wall of the bushing while their inner surfaces will intersect, and thereby will have lateral openings into, the longitudinal bore 13 between the ends of the latter, as shown at 17. Preferably, each bore 14 extends in a straight line through the bushing. Each of these transverse bores receives a plug or lubricant feeder D which is so formed that the course of least resistance for the passage of lubricant therethrough will be lengthwise thereof. These plugs are preferably formed of wood cut longitudinally of the grain. The correlation of the parts is such that the ends 18 of each plug will be presented to one or more of the chambers 10, at or adjacent to the outer surface of the bushing, while its inner surface is concaved at 19 for a part of its length to receive the adjacent part of the pin or shaft C, and conform to the shape thereof, said concave portion being of such depth and length that it extends a material distance into the feeder and across the plane of the feeding channels therein and engages the shaft or pin throughout a material part of the surface of the latter. The bushing is preferably tubular and the pins preferably extend to the peripheral surface thereof and have their ends of shape conforming to said surface.

The advantages of a wheel and bushing thus constructed are many. The construction is such as to enable the bushing to be economically made and accurately fitted to the shaft by forming it with the transverse bores, inserting the plugs therein and then forming it with a longitudinal bore for the shaft or pin C; the last named operation serving not only to hollow out the bushing but also to remove from the plugs the parts thereof which intrude within the diameter required for the shaft-bore, thus assuring an accurate fitting of the feeders upon the shaft or pin. Moreover, when the parts are assembled, each plug or feeder is capable of feeding the oil uniformly and properly to the surface of the shaft or pin, the correlation of the parts being such that each feeder absorbs the lubricant from each of its ends and allows the same to sweep therethrough with a greater degree of freedom than would be the case if the lubricant were compelled to travel crosswise of the grain of the wood, for example. Moreover, the discharge of the lubricant is or may be from a more extended surface than would be the case if the end of the feeder were in contact with the shaft or pin and, again, there is no danger of displacement of the feeder.

In practice, the transverse bores 14 are disposed in a spaced relation along the bushing and in a plurality of separated series, the bores of one series alternating with those of the other series, as shown most clearly in Fig. 4. The corresponding alternating or staggered arrangement of the inner surfaces of the feeders results in a better distribution of the lubricant between the surfaces of the bushing and pin or shaft than would otherwise be possible.

It is preferred to employ four of the partitions or walls 11 and so arrange them that two will be in planes approximately parallel with the feeders D and between the planes of the separated series thereof, while the other two are arranged in planes at right angles to the feeders in a plane which intersects the feeders at about the longitudinal centers of the latter; but this number and arrangement, while advantageous, is not wholly essential to the invention considered in its broader aspects.

In assembling the parts it is preferred to supply the chambers 10 with lubricant while the bushing is being driven home in the axial openings of the body A. When the bushing has been fully inserted into its seats it seals the chambers 10. The usual oil holes in the wheel are omitted, for the reason that they are unnecessary. Possibility of the wheel losing its oil through the oil holes by the shaking out of the plug usually employed to close said holes is thereby overcome.

It has been found in practice that the described bushing and the described division of the wheel into wholly-separated chambers overcomes any need for re-filling the chambers, as the oil seeps through the feeder so slowly that the wheel, particularly when it is a trolley wheel, wears out before the oil from the original filling is exhausted, and before any wear of the bushing is shown. This is an advantage of considerable moment, particularly with trolley wheels, for the reason that it enables the wheels to be shipped with the oil already in place. Moreover, the construction and correlation of parts is such that while the wheels are passing from the manufacturer to subsequent use by the purchaser, the oil has a chance to permeate the wooden plugs, and so keep them from drying out, and the wheel is thus made ready for use at a moment's notice. It should be noted that the construction of the plugs while such that the oil is fed to the shaft or pin along the course of least resistance in the plug, is not such as to permit a sufficiently free flow of the oil as to cause loss thereof when the wheel is not in use. Wood cut longitudinally of the grain answers every requirement in a most practicable and satisfactory manner, but other materials having substantially similar qualities may be employed, if desired.

It will be understood that while the herein exemplified form of the invention has been described somewhat restrictively, this being the form best adapted to carry into practice the several purposes of the invention in the best manner, yet changes in the details may be made without departing from the spirit of the invention or the scope of the subjoined claims.

This application embodies all of the subject matter shown, described and claimed in my co-pending application filed February 29, 1912, Serial No. 680,701.

Having now described the invention what I believe to be new and desire to secure by Letters Patent, is:—

1. In a device of the kind set forth, a body having an axial opening and lubricant chambers; a bushing tightly fitting said axial opening and sealing the same; said bushing being formed with a longitudinal opening and transverse openings, the transverse openings being laterally open between their ends to the longitudinal opening, a shaft mounted in the longitudinal opening of the bushing and extending into the laterally-open parts of the transverse openings, lubricant feeders mounted in the transverse openings and extending across the laterally open parts of the latter and having their sections within said laterally-open parts cut away on the arc of the circumference of the adjacent part of the shaft and receiving the same, said lubricant feeders being adapted to conduct lubricant from each of its ends to its said cut away section, and partitions between the lubricant chambers for causing the lubricant to hug the outer surface of the bushing, said partitions being spaced from each other and having their inner ends in close contact with the outer surface of the bushing.

2. In a device of the kind set forth, a hollow body having axial openings and having its hollow portion provided with a series of inwardly-extending spaced partitions which divide it into a series of separated lubricant chambers, a bushing whose ends are tightly fitted in the axial openings of the body and whose intermediate part extends across the hollow part of the body, said bushing being formed with a longitudinal opening to receive a shaft and provided with a plurality of sets of lubricant feeders, each of which feeders extends transversely of the bushing and has a section between its ends exposed to the longitudinal opening of the bushing, said feeders having their ends arranged to receive lubricant from said chambers and being formed to feed the lubricant longitudinally from their ends to their said intermediate exposed sections, their latter sections being arranged to be in operative relation with the surface of the shaft and said partitions having their inner edges fitted to the circumferential surface of the bushing and being so arranged that some of them will be in planes approximately parallel with the planes of the feeders and between the sets of the latter and others will be in a plane perpendicular to and between the ends of the feeders.

In testimony whereof I have hereunto set my hand in presence of two subscribing witnesses.

JOHN CESSNA SHARP.

Witnesses:
JOHN HICKSON,
R. H. WILLIAMS.